(12) United States Patent
Winston et al.

(10) Patent No.: US 7,761,879 B1
(45) Date of Patent: Jul. 20, 2010

(54) SYSTEM AND METHOD FOR WORKFORCE MANAGEMENT

(75) Inventors: Tony Winston, Southlake, TX (US); Michael Dean Delzer, Frisco, TX (US)

(73) Assignee: American Airlines, Inc., Fort Worth, TX (US)

(*) Notice: Subject to any disclaimer, the term of this patent is extended or adjusted under 35 U.S.C. 154(b) by 1350 days.

(21) Appl. No.: 11/222,416

(22) Filed: Sep. 8, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .......................... 719/314; 705/9
(58) Field of Classification Search ............... 719/313, 719/314; 705/9
See application file for complete search history.

(56) References Cited

U.S. PATENT DOCUMENTS

| | | | |
|---|---|---|---|
| 5,497,141 A * | 3/1996 | Coles et al. | 340/309.7 |
| 6,310,888 B1 * | 10/2001 | Hamlin | 370/466 |
| 6,480,830 B1 * | 11/2002 | Ford et al. | 705/9 |
| 6,560,628 B1 * | 5/2003 | Murata | 718/103 |
| 7,406,537 B2 * | 7/2008 | Cullen | 709/238 |
| 2001/0049702 A1 * | 12/2001 | Najmi | 707/513 |
| 2003/0036966 A1 * | 2/2003 | Amra et al. | 705/26 |
| 2004/0028212 A1 * | 2/2004 | Lok et al. | 379/265.09 |
| 2004/0131082 A1 * | 7/2004 | Evans et al. | 370/469 |
| 2006/0111957 A1 * | 5/2006 | Carmi et al. | 705/9 |

OTHER PUBLICATIONS

George Franciscus, "Building an XML-based Message Server", Nov. 1, 2001, IBM, DeveloperWorks, pp. 1-6.*

* cited by examiner

*Primary Examiner*—Hyung S Sough
*Assistant Examiner*—KimbleAnn Verdi
(74) *Attorney, Agent, or Firm*—Haynes and Boone, LLP

(57) ABSTRACT

A system and method for workforce management. Information is received from a first application. The information is converted into a message in accordance with a predefined syntax. The message is placed into a queue. A topic is received from a second application. A determination is made if the message corresponds to the topic, and the message is sent to the second application.

10 Claims, 5 Drawing Sheets

SYSTEM AND METHOD FOR WORKFORCE MANAGEMENT

BACKGROUND

Many companies have employees and other resources that are tracked, monitored, and managed. The tracking, monitoring, and managing of employees may be done manually, using a single software application, using a combination of software applications, or a combination of any or all of the foregoing. At times, a particular company may track, monitor, or manage its employees in a manner that it deems inefficient or non-optimal.

DETAILED DESCRIPTION

Figure 1:
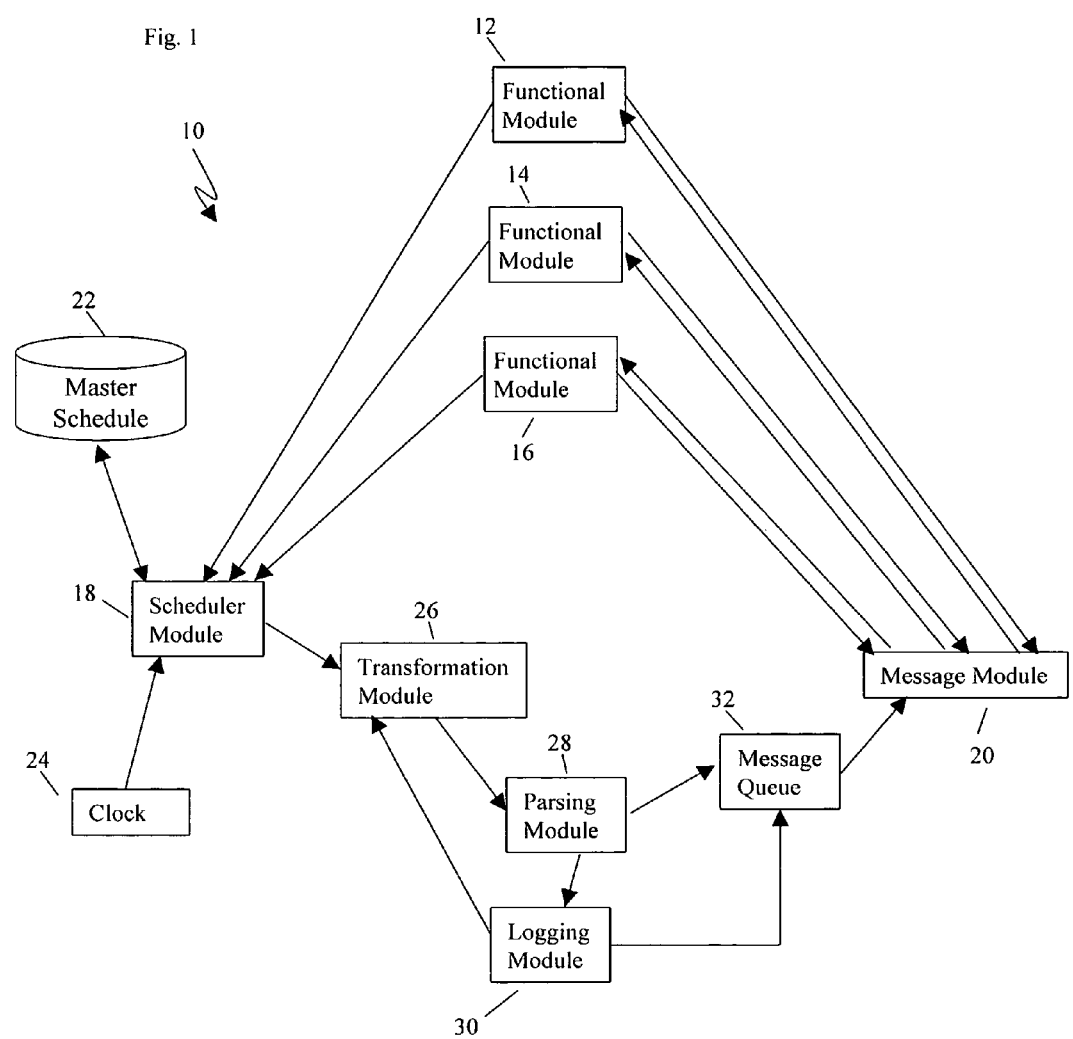
FIG. 1 is a diagram of an example embodiment of the present invention.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

Referring to FIG. 1, a embodiment 10 of a system for workforce management is shown. System 10 comprises functional modules 12, 14, and 16. Functional modules 12, 14, and 16 provide different functions to the system 10, and will be described in more detail below. Each functional module 12, 14, and 16 is capable of communicating with scheduler module 18 and message module 20.

Scheduler module 18 pulls information from functional modules 12, 14, and 16, and communicates with master schedule 22 and clock 24. In one embodiment, scheduler module 18 pulls information from functional modules 12, 14, and 16 in real-time.

Master schedule 22 contains the schedule across the enterprise. Clock 24 is a time clock that provides time and date information to scheduler module 18. Clock 24 can be used to monitor the arrival and departures of resources.

Scheduler module 18 sends the information pulled from functional modules 12, 14, and 16 to transformation module 26. In one embodiment, scheduler module 18 sends the information to transformation module 26 in real-time.

Transformation module 26 is capable of converting the information into XML using an XML schema data dictionary. Transformation module 26 may also use business rules to manipulate or modify the information. The business rules can be parameters, thresholds, or requirements for how to handle the information. For example, data may be received from clock 24 that an employee arrived at 9:01 a.m. A business rule could be implemented than any arrivals within a ten minute window after the hour are set to the hour. Accordingly, transformation module 26 would modify the 9:01 a.m. data to indicate a 9:00 a.m. arrival time. In another example, a business rule could be that if an employee arrives fifteen minutes after a scheduled time that a message is generated for receipt by a manager to notify the manager that the employee arrived late. Other business rules could be implemented, as would be understood by one of ordinary skill in the art.

Parsing module 28 receives the XML formatted information and determines if the syntax of the information is correct. If the syntax is not correct, it means that the functional module that provided the information did not provide sufficient data elements.

Logging module 30 receives an error message from parsing module 30 if there was incorrect syntax. Logging module 30 records the error message and sends an event notice to transformation module 26. Transformation module 26 converts the error message into an error event in the format that the ERM will understand and sends the error event to message queue 32.

Message queue 32 receives the XML formatted information from the parsing module 28 and from logging module 30. Message module 20 responds to requests from functional modules 12, 14, and 16. Functional modules tell message module 20 what topics the listener wants. An example topic is "vacation". A message queue, used in a point-to-point messaging system, receives messages from many senders and puts them in one queue to one receiver. That receiver might be, for example, an EIS system. A topic, used in a publish-subscribe messaging system, receives messages from many senders and sends them to many receivers, which subscribe to the topic.

Based on the listener modules, message module 20 transmits the XML information to the functional module that is listening for the related topic.

Figure 2:
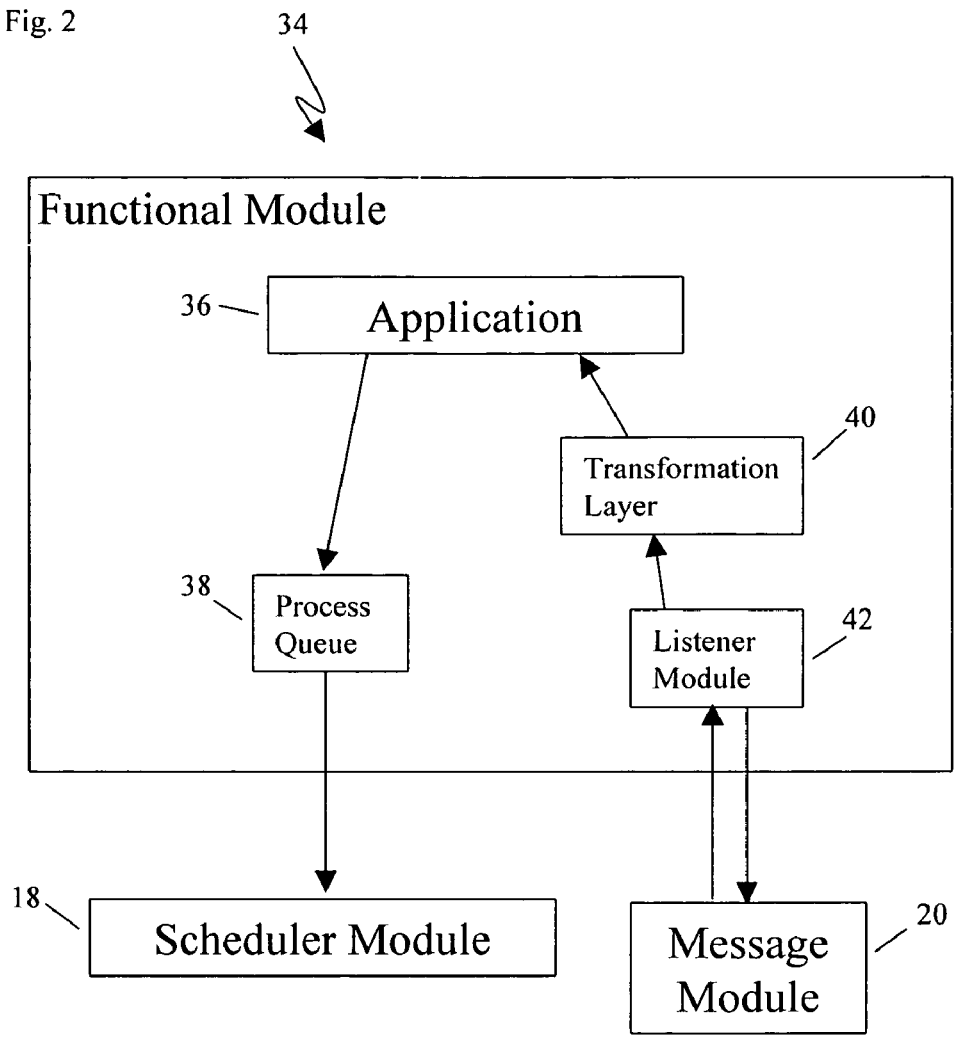
FIG. 2 is a diagram of an example embodiment of a functional module of the present invention.

Referring now to FIG. 2 is an example functional module 34 for use in an embodiment of the present invention. Functional module 34 comprises an application 36, a process queue 38, a transformation layer 40, and a listener module 42.

Application 36 can be any form of functionality or application that could be used for managing a workforce, such as a software application for enterprise resource management or a software application for managing employees. Other applications could include a training module, a payroll system, a human resources system, or any other module or system that could be used in a workforce environment. In one embodiment, application 36 is accessed by a user using a web browser. In another embodiment, the application 36 is located locally on a user's computer and communicates with a server.

Application 36 provide inputs to process queue 38. In one embodiment, the communication from application 36 to process queue 38 is in a syntax determined by the vendor of application 36. In another embodiment, the communication from application 36 to process queue 38 is in a syntax determined by a user of application 36. Communication from application 36 to process queue 38 is any data, request, information, or other item that could be transmitted by application 36. In one embodiment, the input may comprise a set of data elements.

Process queue 38 can be any mechanism that can store a series of inputs. In one embodiment, process queue 38 is a table. In another embodiment, process queue 38 is a database.

In one embodiment, the scheduler module 18 submits a query to the process queue 38 requesting that the process queue 38 send all events that match the query to scheduler module 18.

Listener module 42 communicates with message module 20 as to the topics that are applicable to application 36. In one embodiment, the communications between listener module 42 and message module 20 are performed using electronic messaging services, such as the Java Message Service (JMS). JMS offers an API and a set of semantics that prescribe the interface and general behavior of a messaging service. In another embodiment, the requests from listener module 42 are sent through an adapter that creates a wrapper around the JMS request in order to communicate with message module 20.

Message module 20 sends information that matches the topics requests by listener module 42.

In one embodiment, the information received by listener module 42 is formatted in an extensible markup language, such as XML. Listener module 42 may send the XML formatted information to transformation layer 40. Transformation layer converts the XML information to the syntax of application 36. In another embodiment, listener module 42 may send the information directly to application 36.

Figure 3:
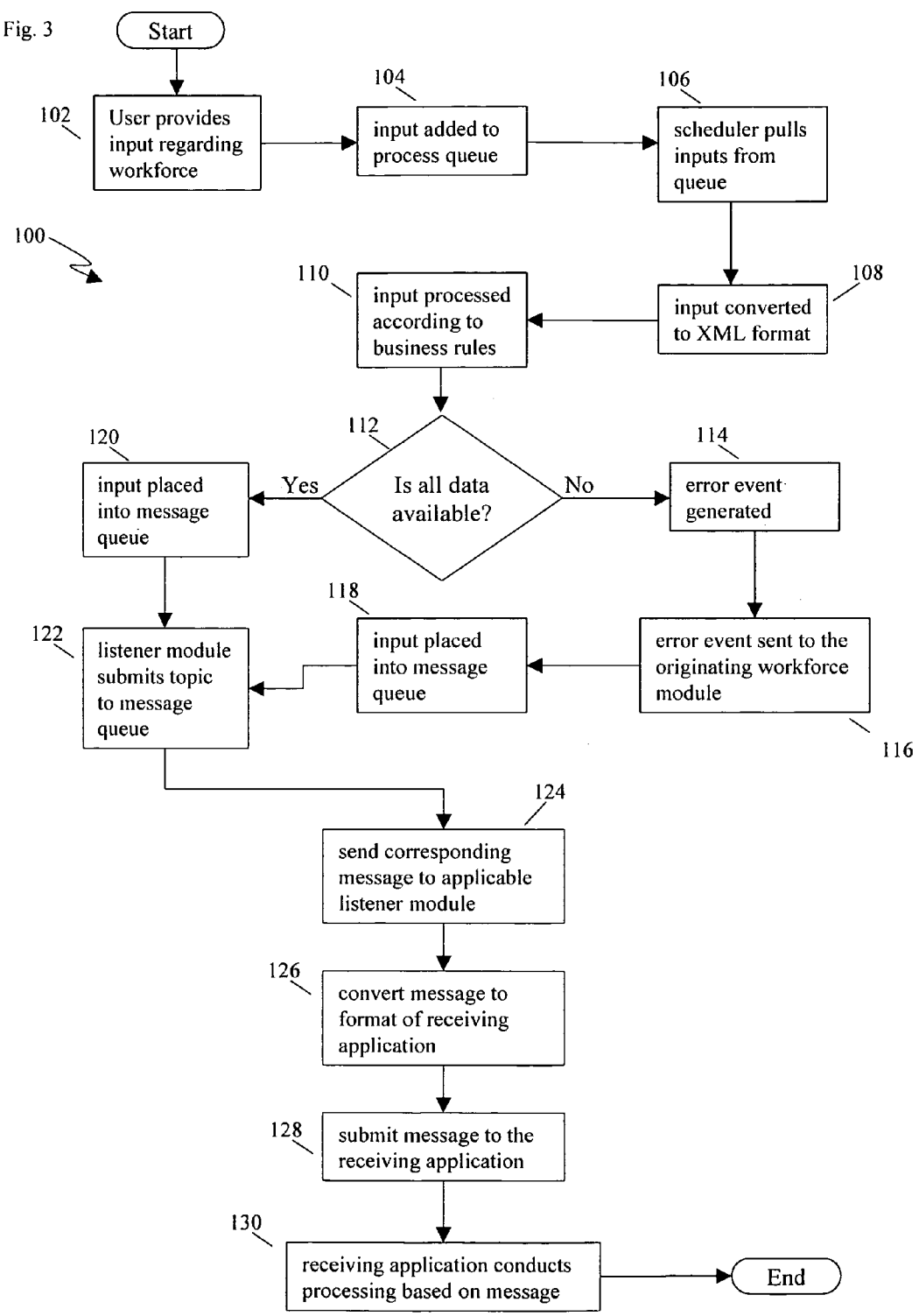
FIG. 3 depicts the operational flow of an embodiment of the present invention.

FIG. 3 refers to an operational flow 100 of an embodiment of the present invention. At step 102, a resource provides an input regarding a workforce in an enterprise. At step 104, the input is added to a process queue.

At step 106, a scheduler pulls the inputs that are currently in the process queue. At step 108, the input is converted into an XML format. In one embodiment, the XML format is a standard workforce XML vocabulary. In addition, there may be XML schemas that define message constructs and event types. At step 110, the input is processed according to business rules.

At step 112, the input is validated to determine that all of the relevant data is available. If there is not the correct data, the operation proceeds to step 114, where an error event is generated. The error event is formatted into XML format, step 116. At step 118, the error event is placed into a message queue.

If the data is correct in the input at step 112, then the operation proceeds to step 120, where the input is placed into a message queue. At step 122, a listener module detects that a message has arrived for a particular topic in a message queue.

At step 124, the message is delivered to the listener modules listening to a particular queue. At step 126, the input in the message is converted to the syntax of the application corresponding to the listener module. At step 128, the input is submitted to the receiving application. At step 130, the receiving application conducts the relevant processing based on the input.

Figure 4:
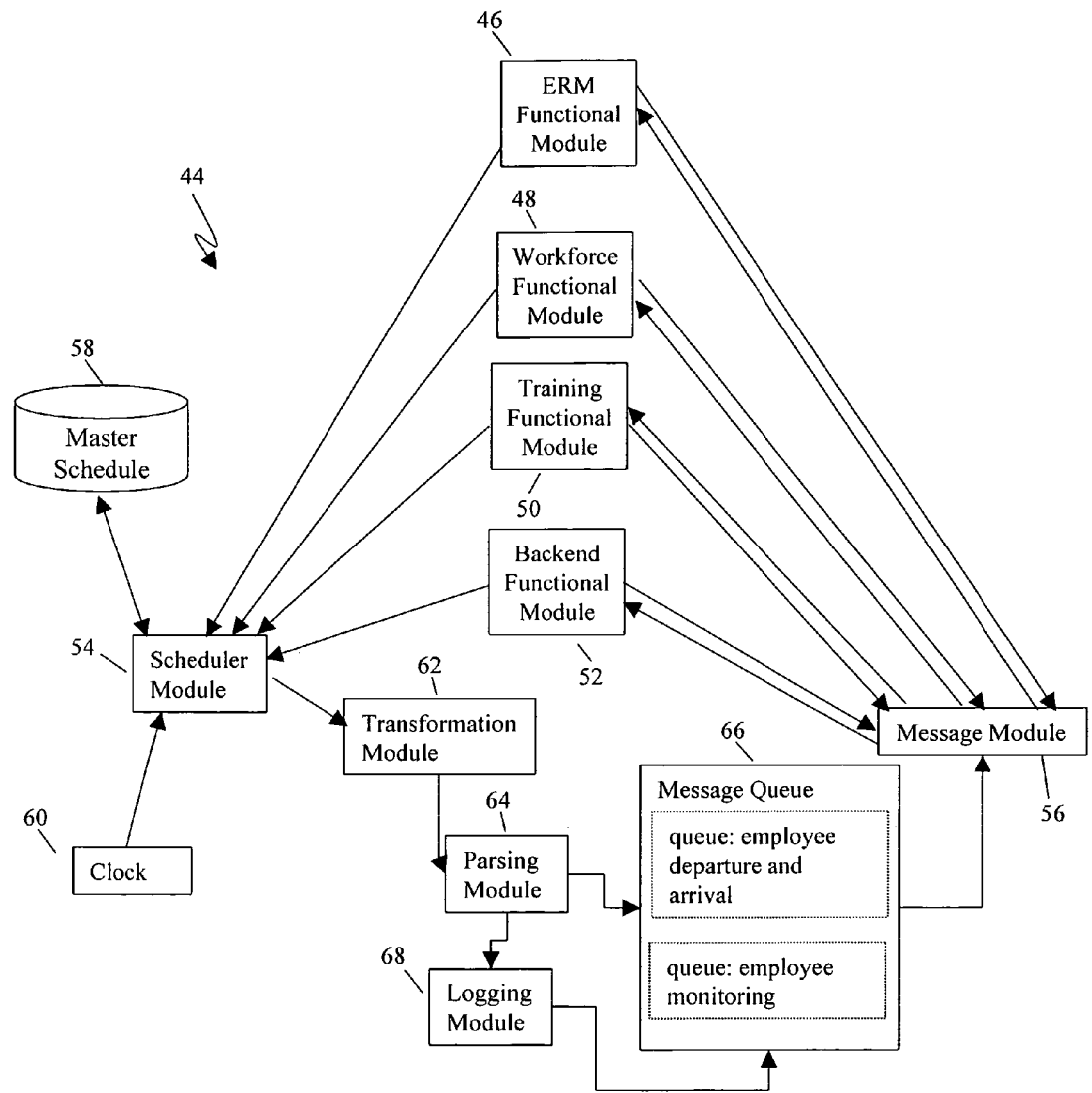
FIG. 4 is a diagram of an example embodiment of the present invention.

FIG. 4 is an example embodiment 44 of the present invention. An enterprise resource management (ERM) functional module 46, a workforce functional module 48, a training functional module 50, and a backend functional module 52 are in communication with scheduler module 54 and message module 56.

The ERM functional module 46 has the functionality to monitor, track, and manage resources, such as employees. In one embodiment, the ERM functional module 46 can receive change requests from resources. Examples of change requests include a request for vacation, a request for time off, a request to trade shifts.

In one embodiment, the ERM functional module 46 can have a presentation package, a business rules package, a reporting package, a workflow package, and an integration package. The presentation package allows a user to interact with the system. In one embodiment, the presentation package can be a web-enable application or services component.

The business rules package contains rules for work process management and union workforce requirements. There may be a basic set of rules, as well as company-specific business rules. The reporting package provides customized workforce reporting features and allows user specified report formats. The workflow package provides the work process management functionality for the ERM functional module. The integration package delivers the ERM initiated messages and provides the store and forward functionality to the queue. It can also provide a JMS API for integration with J2EE containers.

In one embodiment, the workforce functional module 48 has the functionality to allow managers to manage resources. The workforce functional module 48 can have a presentation layer, reporting layer, scheduling layer, forecasting layer, and an integration layer. The presentation layer provides the user with the ability to access the scheduling and forecasting layer. In one embodiment, an application is stored on a client workstation and the application communicates using a transport protocol, such as TCP/IP. The reporting layer allows user specified reporting. The forecasting layer provides schedule forecasts and creates workload recommendations using historical inputs from real-time data feeds. The integration layer delivers workforce manager initiated messages to a queue. In one embodiment, the integration layer is implemented using a C++ adapter to expose the integration layer's API's calls to the workforce manager. In one embodiment, the integration layer uses IPC communications to the queue management components.

The backend functional module tracks and provides information on pay rate, seniority date, address, employee number, job code, station/branch information.

Scheduler module 54 is in communication with a master schedule 58.

Clock 60 provides time and date information about resources to scheduler module 54. In one embodiment, clock 60 is comprised of at least one employee clock-in, clock-out station where an employee presents an employee identification card (such as by swiping through a card reader) to signify the employee's arrival and departure. Clock 60 reads the employee identification information and submits the time and date information about that employee to scheduler module 54.

Information received at scheduler module 54 is communicated to transformation module 62 for conversion into XML according to a predefined XML schema data dictionary. The XML converted information is submitted to parsing module 64. Parsing module 64 parses the information as described above and submits the information to message queue 66. Logging module 68 is in communication with each of parsing module 64 and message queue 66.

Message module 56 receives topic requests from the ERM functional module 46, the workforce functional module 48, the training functional module 50, and the backend functional module.

For example purposes, a sequence of events will be discussed to show the operation of a particular embodiment of the invention. An employee arrives at work at 9:16 a.m. and swipes an employee identification card at clock 60. Clock 60 submits the employee information and time and date stamp to scheduler module 54. Scheduler module 54 communicates with master schedule 58 to retrieve the schedule of the employee and submits that information to transformation module 62.

Transformation module 62 reviews the business rules regarding the employee. The employee is scheduled to arrive at 9:00 a.m. and a business rule indicates that for arrivals ten minutes or later after the scheduled arrival time, the employee's manager is to be notified. Transformation module 62 uses the XML schema data dictionary to format a first message about the employee's arrival time. The data dictionary defines this type of message as relating to employee arrival time, so the message is formatted to indicate that it is "employee arrival time." Transformation module 62 also uses the XML schema data dictionary to format a second message for notifying the employee's manager. The data dictionary defines this type of message as relating to employing monitor, so the message is formatted to indicate that is "employee monitoring". Each message is submitted to parsing module 64.

In this instance, each message contains all of the necessary data and each message is submitted by parsing module 64 to message queue 66. In this example, there are multiple messages queues, such as "employee arrival and departure" and "employee monitoring." Message module 56 has received topic information from ERM functional module 46 asking for "employee arrival and departure". Workforce functional module 48 has submitted topic information for "employee monitoring". The backend functional module 52 has also submitted topic information for "employee monitoring".

The message module examines message queue 66 and determines that there is a message that matches the topic "employee arrival time". The message pertaining to the employee's arrival time is sent to the ERM functional module 46. The message module also determines that there is a message that matches the topic "employee monitoring". Since there are two function modules listening on that topic, each function module (in this instance, workforce functional module 48 and backend module 52) are sent the message.

The ERM functional module 46 receives the message at its listener module, which sends the message to the transformation layer. The transformation layer converts the XML formatted message into the syntax understood by the application. The application then acts upon the information. For example, the ERM application might receive the input information about the employee's arrival time and place that information on the employee's workstation's display.

Similarly, the workforce module 48 receives its message at its listener module, and the transformation layer converts the XML message into the syntax understood by the application. The application then acts upon the information. For example, the workforce application might receive the input information about the employee's arrival time being outside the acceptable time limit and display a notice message to the employee's manager and create an email for the manager to send to the employee about the employee's arrival time.

Additionally, the backend module 52 receives its message at its listener module, and the transformation layer converts the XML message into the syntax understood by the application. In this instance, the backend module may be payroll software, and the application processing might be to deduct a certain amount of pay from the employee's next pay check.

As different or new functionality is needed within the system, a new functional module can be added (or used as a replacement for an existing functional module), without necessarily having to modify the existing functional modules. Functional modules can be added without affecting or limiting the functionality of the application without the functional modules. In this manner, disparate functional modules can become interconnected using an embodiment of the present invention to monitor, track, and manage day-to-day workload and schedules of employees and other resources.

Figure 5:
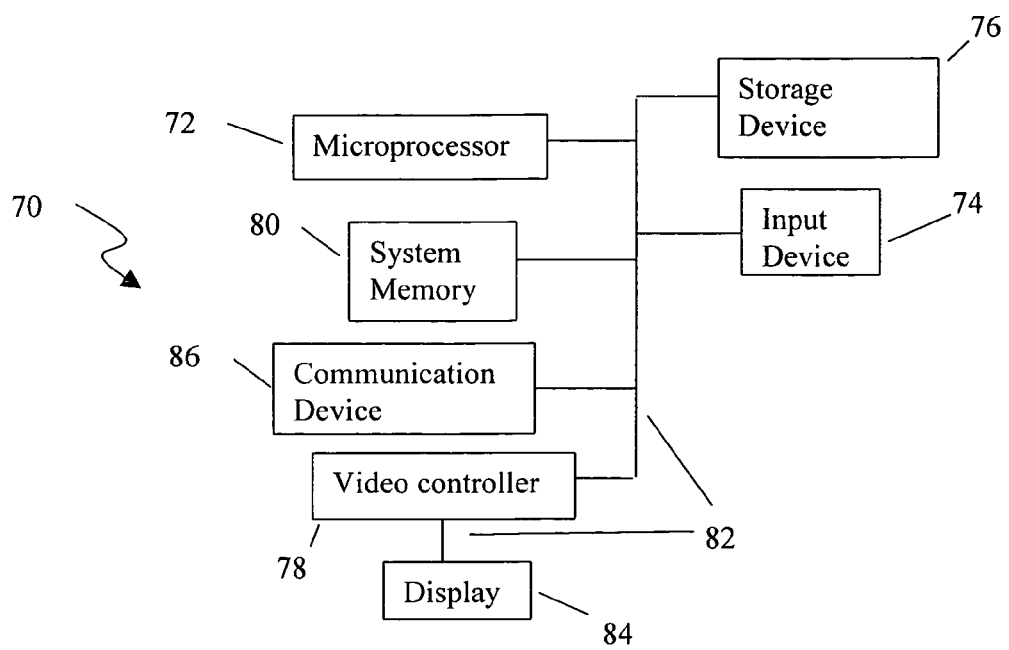
FIG. 5 is a diagram of an example computing device for implementing an embodiment of the present invention.

It will also be understood by those having skill in the art that one or more (including all) of the modules, elements, and steps of the present invention may be implemented using software executed on a general purpose computer system or networked computer systems, using special purpose hardware-based computer systems, or using combinations of special purpose hardware and software. Referring to FIG. 5, an illustrative node 70 for implementing an embodiment of the method is depicted. Node 70 includes a microprocessor 72, an input device 74, a storage device 76, a video controller 78, a system memory 80, and a display 84, and a communication device 86 all interconnected by one or more buses 82. The storage device 76 could be a floppy drive, hard drive, CD-ROM, optical drive, or any other form of storage device. In addition, the storage device 76 may be capable of receiving a floppy disk, CD-ROM, DVD-ROM, or any other form of computer-readable medium that may contain computer-executable instructions. Further, communication device 86 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Also, while depicted as distinct modules or elements, the modules and elements described herein may be combined into a single module or other number of modules, and may further be implemented in hardware or software form, or a combination thereof. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as ORACLE® database software, MICROSOFT ACCESS® database software, SYBASE® database software, or DBASE® II database software, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

In one embodiment, a method for workforce management comprises receiving information from a first application, converting the information into a message in accordance with a predefined syntax, placing the message into a queue, receiving a topic from a second application, determining if the message corresponds to the topic; and sending the message to the second application.

In another embodiment, a system for managing a workforce comprises a scheduler module, a first application in communication with the scheduler module, wherein the first application has a first syntax, a second application in communication with the scheduler module, wherein the second application has a second syntax, a transformation module that converts a first information, which was received from the first application in the first syntax, to a third syntax, a message module that communicates with the first application, and a message queue that communicates with the transformation module.

In a further embodiment, a method for managing a workforce with a plurality of applications, comprises querying a process queue that corresponds to a first one of the plurality of applications, receiving, from the process queue, a first information having a first syntax that corresponds to the first one of the plurality of applications, converting the first information having the first syntax into a message having an XML syntax, placing the message into a message queue, receiving a first topic from a listener module associated with a second one of the plurality of applications, determining if the message corresponds to the first topic, sending the message to the listener module, transforming the message into a second information having a second syntax that corresponds to the second one of the plurality of applications, and sending the second information having the second syntax to the second one of the plurality of applications.

In yet another embodiment, a computer-readable medium comprises a series of instructions for execution by at least one computer processor, wherein the instructions are for receiving information from a first application, converting the information into a message in accordance with a predefined syntax, placing the message into a queue, receiving a topic from a second application, determining if the message corresponds to the topic, sending the message to the second application, and converting the message into a syntax usable by the second application.

In an additional embodiment, a system for managing a workforce comprises means for querying a process queue that corresponds to a first one of the plurality of applications, means for receiving, from the process queue, a first information having a first syntax that corresponds to the first one of the plurality of applications, means for converting the first information having the first syntax into a message having an XML syntax, means for placing the message into a message queue, means for receiving a first topic from a listener module associated with a second one of the plurality of applications, means for determining if the message corresponds to the first topic, means for sending the message to the listener module, means for transforming the message into a second information having a second syntax that corresponds to the second one of the plurality of applications, and means for sending the second information having the second syntax to the second one of the plurality of applications.

It is understood that the system and method for adaptive forecasting could be used in any form of travel or logistics industry, including the airline industry rail industry, cruise industry, shipping industry, and bus travel, and could be used in call centers, warehousing, manufacturing facilities, grocery stores, or any other location where a number of resources, such as employees, need to be tracked, monitored, or managed.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for communicating messages between a plurality of applications, comprising:
  receiving information having a first syntax from a first application;
  converting, using a computer processor, the information having a first syntax into a first message in accordance with a first business rule, wherein the first message has an extensible markup language (XML) syntax;
  placing the first message into a message queue;
  converting, using the computer processor, the information having a first syntax into a second message in accordance with a second business rule, wherein the second message has an XML syntax;
  placing the second message into the message queue;
  receiving a topic from a second application;
  determining, using the computer processor, if one of the first and second messages corresponds to the topic;
  converting, using the computer processor, the one of the first and second messages determined to correspond to the topic into a third message having a second syntax usable by the second application; and
  sending the third message corresponding to the topic to the second application.

2. The method of claim 1, further comprising:
modifying the information based on business rules.

3. The method of claim 1, further comprising:
receiving the topic from a third application; and
sending the one of the first and second messages determined to correspond to the topic to the third application.

4. The method of claim 1, further comprising:
receiving a second topic from a third application.

5. The method of claim 1, further comprising:
parsing the information.

6. A method for communicating messages with between a plurality of applications, comprising:
querying a process queue that corresponds to a first one of the plurality of applications;
receiving, from the process queue, a first input having a first syntax that corresponds to the first one of the plurality of applications;
converting, using a computer processor, the first input having the first syntax into a first message in accordance with a first business rule, wherein the first message has an extensible markup language (XML) syntax;
placing the first message into a message queue;
converting, using the computer processor, the first input having the first syntax into a second message in accordance with a second business rule, wherein the second message has an XML syntax;
placing the second message into the message queue;
receiving a first topic from a listener module associated with a second one of the plurality of applications;
determining, using the computer processor, if one of the first and second messages corresponds to the first topic;
sending the one of the first and second messages determined to correspond to the first topic to the listener module;
transforming, using the computer processor, the one of the first and second messages determined to correspond to the first topic into a second input having a second syntax that corresponds to the second one of the plurality of applications; and
sending the second input having the second syntax to the second one of the plurality of applications.

7. The method of claim 6, further comprising:
querying a second process queue that corresponds to a third one of the plurality of applications;
receiving, from the second process queue, a third input having a third syntax that corresponds to the third one of the plurality of applications;
converting the third input having the third syntax into a third message having an XML syntax;
placing the third message into a message queue;
determining if the third message corresponds to the first topic;
sending the third message to the listener module;
transforming the third message into a fourth input having the second syntax; and
sending the fourth input having the second syntax to the second one of the plurality of applications.

8. The method of claim 6, further comprising:
receiving a second topic from a listener module associated with a third one of the plurality of applications, wherein the third one of the plurality of applications utilizes a third syntax.

9. A non-transitory computer-readable medium comprising a series of instructions for execution by at least one computer processor, the instructions when executed cause the computer processor to perform the steps of:
querying a process queue that corresponds to a first application;
receiving, from the process queue, a first input having a first syntax that corresponds to the first application;
converting the first input having the first syntax into a first message in accordance with a first business rule, wherein the first message has an extensible markup language (XML) syntax;
placing the first message into a message queue;
converting the first input having the first syntax into a second message in accordance with a second business rule, wherein the second message has an XML syntax;
placing the second message into the message queue;
receiving a first topic from a listener module associated with a second application;
determining if one of the first and second messages corresponds to the first topic;
sending the one of the first and second messages determined to correspond to the first topic to the listener module;
transforming the one of the first and second messages determined to correspond to the first topic into a second input having a second syntax that corresponds to the second application; and
sending the second input having the second syntax to the second application.

10. A system for communicating messages between a plurality of applications, comprising:
means for querying a process queue that corresponds to a first one of the plurality of applications;
means for receiving, from the process queue, a first input having a first syntax that corresponds to the first one of the plurality of applications;
means for converting the first input having the first syntax into a first message in accordance with a first business rule, wherein the first message has an extensible markup language (XML) syntax;
means for placing the first message into a message queue;
means for converting the first input having the first syntax into a second message in accordance with a second business rule, wherein the second message has an XML syntax;
means for placing the second message into the message queue;
means for receiving a first topic from a listener module associated with a second one of the plurality of applications;
means for determining if one of the first and second messages corresponds to the first topic;
means for sending the one of the first and second messages determined to correspond to the first topic to the listener module;
means for transforming the one of the first and second messages determined to correspond to the first topic into a second input having a second syntax that corresponds to the second one of the plurality of applications; and
means for sending the second input having the second syntax to the second one of the plurality of applications.

* * * * *